No. 652,662. Patented June 26, 1900.
E. C. BURR & J. W. ATKINSON.
DISCHARGING MECHANISM FOR MEASURING TANKS FOR CARBONATORS.
(Application filed Nov. 27, 1899.)
(No Model.)
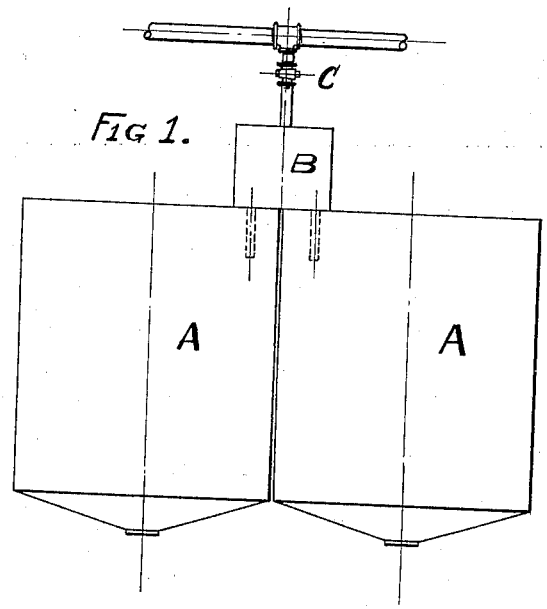
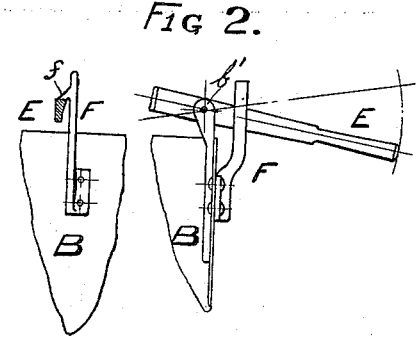
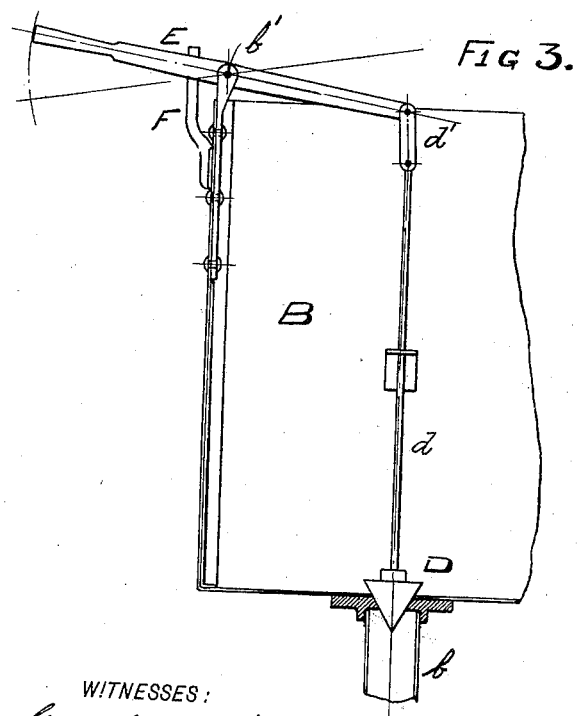
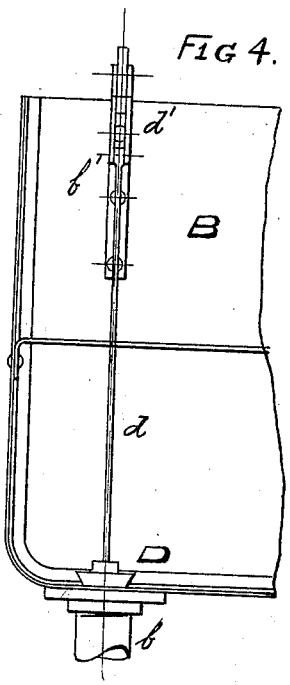
WITNESSES:
George H. Kirsch.
Walter F. Vaus.
INVENTORS
Edmund C. Burr and John W. Atkinson,
BY
Wm. F. Booth,
their ATTORNEY

UNITED STATES PATENT OFFICE.

EDMUND C. BURR, OF SAN FRANCISCO, AND JOHN W. ATKINSON, OF SANTA MARIA, CALIFORNIA, ASSIGNORS OF ONE-THIRD TO JOHN C. H. STUT, OF OAKLAND, CALIFORNIA.

DISCHARGING MECHANISM FOR MEASURING-TANKS FOR CARBONATORS.

SPECIFICATION forming part of Letters Patent No. 652,662, dated June 26, 1900.

Application filed November 27, 1899. Serial No. 738,399. (No model.)

*To all whom it may concern:*

Be it known that we, EDMUND C. BURR, residing at the city and county of San Francisco, and JOHN W. ATKINSON, residing in Santa Maria, Santa Barbara county, California, citizens of the United States, have invented certain new and useful Improvements in Discharging Mechanism for Measuring-Tanks of Carbonators; and we do hereby declare the following to be a full, clear, and exact description of the same.

Our invention relates generally to those portions of the apparatus or machinery in beet-sugar factories in which the juice is treated with milk of lime and carbonic-acid gas and which from this fact are known as "carbonators," or "carbonation pans or tanks." These pans or carbonators have small tanks just above them, which receive the measure of milk of lime intended for the carbonators. They are supplied by a general pipe system, and each is fitted with means for discharging its contents into the underlying carbonator.

Our invention consists in an improved discharging mechanism for these measuring-tanks; and its object is to afford not only facility of operation to the workman, but also the greatest accuracy of control of the discharge, permitting the ready and rapid outflow of the contents and closing the outlet again with precision and efficacy.

Referring to the accompanying drawings, Figure 1 is an elevation of the measuring-tank above a pair of carbonators. Fig. 2 shows a detail of the lever-holding catch. Fig. 3 is a side view of the valve mechanism in the measuring-tank. Fig. 4 is a front view of same.

A are carbonators. There may be as many of these as desired.

B are the lime-measuring tanks. There may be one of these for each carbonator, or one for each pair. This is only a choice of construction. We here show them as located above the carbonators, so that their contents may pass down into the latter by gravity.

C indicates the supply connection for the tanks, whereby they can be filled with milk of lime to the capacity desired. In the bottom of the measuring-tank is an outlet-hole $b$, which is so made or lined as to form an inverted conical seat for the corresponding gravity-valve D, which said valve has a stem $d$, to the upper end of which is connected a link $d'$.

E is a lever fulcrumed in a bracket $b'$, secured to tank B and having its inner end connected with link $d'$. Upon the tank B is a spring F, the upper end of which is formed or provided with a hook $f$, which is adapted when the handle end of the lever is forced down to engage with said lever and hold it down, thus holding the valve D open. The normal position of the valve D is down in its seat, thus closing the outlet $b$.

The tank B is filled with milk of lime to the proper level, and when it is necessary to empty its contents into the carbonator the workman pushes down lever E, which, as before stated, lifts valve D. The spring-catch F holds the lever down and the valve open, and the contents of the tank B are thus discharged with great facility. Then the workman knocks aside the spring-catch F and the valve D drops to its seat. Its inverted conical shape is of great advantage in this connection in that by reason of it it is enabled not only to find and return to its seat with accuracy and precision, no matter how roughly the mechanism may be handled, but also to find its seat and close the outlet with an efficiency due not to initial accuracy, as would be the case with a ground steam-valve, but to its use in a material more or less gritty. In this case, by reason of the grit, the valve need not be ground to a fit, but will on account of its conical shape work itself, with the help of the grit, to a place in its seat where it will effectually close the outlet, thus rendering it particularly adaptable for the present use.

Having thus described our invention, what we claim as new, and desire to secure by Letters Patent, is—

In combination with a measuring-tank for carbonators, said tank having a conicalshaped outlet in its bottom, an inverted conical gravity-valve, adapted to find a seat in said outlet and having a stem rising within the tank, a lever fulcrumed to the tank above, a link connecting the inner end of the lever with the valve-stem, and spring secured to the tank and having a hook upon its upper end adapted to engage with the lever to hold it down whereby the valve is maintained in a raised position and to be disengaged from the lever to drop the valve to its seat.

In witness whereof we have hereunto set our hands.

EDMUND C. BURR.
JOHN W. ATKINSON.

Witnesses to the signature of E. C. Burr:
D. B. RICHARDS,
WALTER F. VANE.

Witnesses to the signature of J. W. Atkinson:
A. L. PARSONS,
W. F. KELLEY.